(12) United States Patent
Yamamoto

(10) Patent No.: US 11,513,745 B2
(45) Date of Patent: Nov. 29, 2022

(54) INFORMATION PROCESSING APPARATUS, INFORMATION PROCESSING SYSTEM, AND COMPUTER-READABLE MEDIUM

(71) Applicant: Kengo Yamamoto, Kanagawa (JP)

(72) Inventor: Kengo Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/986,471

(22) Filed: Aug. 6, 2020

(65) Prior Publication Data

US 2021/0042065 A1 Feb. 11, 2021

(30) Foreign Application Priority Data

Aug. 8, 2019 (JP) .............................. JP2019-146302
Jun. 25, 2020 (JP) .............................. JP2020-109620

(51) Int. Cl.
*G06F 3/12* (2006.01)
(52) U.S. Cl.
CPC ............ *G06F 3/1208* (2013.01); *G06F 3/121* (2013.01); *G06F 3/1234* (2013.01); *G06F 3/1256* (2013.01); *G06F 3/12* (2013.01)
(58) Field of Classification Search
CPC ...... G06F 3/1208; G06F 3/121; G06F 3/1234; G06F 3/1256; G06F 3/126; G06F 3/1282; G06F 3/1259; G06T 2207/10024; G06T 2207/30144; G06T 7/001; H04N 1/00442; H04N 1/00482; H04N 1/00132; H04N 1/2166; H04N 1/12; H04N 1/1204
USPC ....................................................... 358/1.15
See application file for complete search history.

(56) References Cited

U.S. PATENT DOCUMENTS

2013/0182002 A1* 7/2013 Macciola ............... G06V 10/25
345/589
2015/0220809 A1 8/2015 Kawabata et al.
2015/0269719 A1* 9/2015 Kitai ....................... G06T 7/001
358/474

(Continued)

FOREIGN PATENT DOCUMENTS

JP 2015-194484 5/2015

OTHER PUBLICATIONS

Extended European Search Report dated Jan. 19, 2021.

*Primary Examiner* — Darryl V Dottin
(74) *Attorney, Agent, or Firm* — Harness, Dickey & Pierce, P.L.C.

(57) ABSTRACT

An information processing apparatus includes circuitry configured to display a display screen. The display screen includes a first display or a second display, and a third display. The first display displays, in units of a print job, checking result information obtained by comparing a read result with reference data on an image to be formed on the recording medium. The read result is obtained by reading a recording medium having an image formed. The second display displays, among print jobs, only a print job including a page having at least one abnormality in the image formed on the recording medium based on the checking result information. The third display displays information about the page in the print job including the page having the at least one abnormality and abnormality type information indicating a type of the at least one abnormality present in the page.

18 Claims, 16 Drawing Sheets

(56) References Cited

U.S. PATENT DOCUMENTS

2016/0142560 A1    5/2016  Shijoh
2020/0312209 A1*  10/2020  Yang ........................ G09G 3/20

* cited by examiner

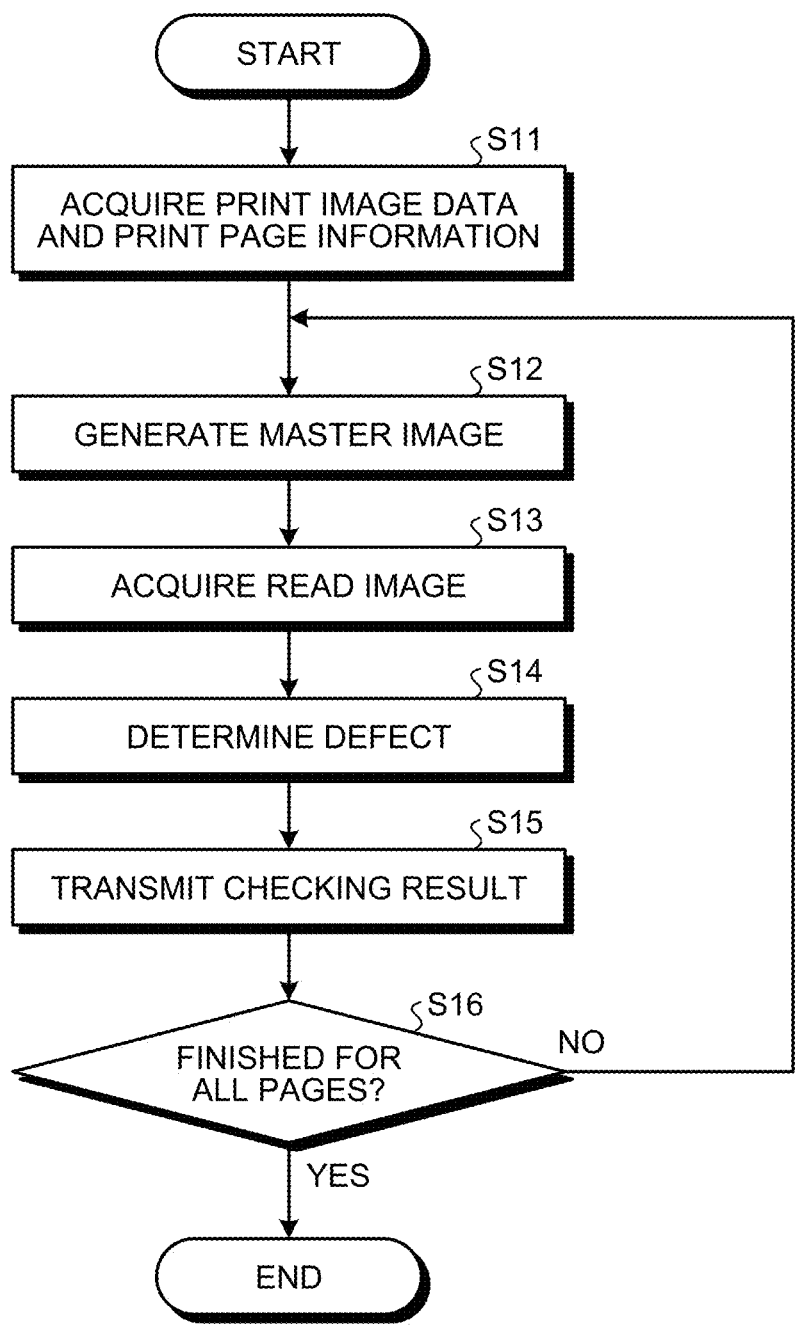

FIG.7

(a) JOB LOG

| SET ID | JOB ID | DATE AND TIME OF PRINTING | THRESHOLD PRESET NAME | TOTAL NUMBER OF PAGES | READ/ UNREAD FLAG | THUMBNAIL IMAGE PATH |
|---|---|---|---|---|---|---|
| bf523299 | 1 | 2019-06-10 12:14:57 | Level 1 | 47 | 1 | thumbnail/bf523299.png |
| a0fb76e8 | 2 | 2019-06-10 15:30:18 | Level 2 | 79 | 1 | thumbnail/a0fb76e8.png |
| 4bfa30ff | 3 | 2019-06-10 15:35:32 | Level 3 | 129 | 0 | thumbnail/4bfa30ff.png |
| ... | ... | ... | ... | ... | ... | ... |

(b) PAGE LOG

| PAGE ID | DATE AND TIME OF PRINTING | COPY NUMBER | PAGE NUMBER | SET ID | IMAGE PATH |
|---|---|---|---|---|---|
| 1 | 2019-06-10 15:35:12 | 1 | 47 | 4bfa30ff | scan/1.png |
| 2 | 2019-06-10 15:35:21 | 2 | 36 | 4bfa30ff | scan/2.png |
| 3 | 2019-06-10 15:35:326 | 2 | 67 | 4bfa30ff | scan/3.png |
| ... | ... | ... | ... | ... | ... |

(c) DEFECT LOG

| PAGE ID | DEFECT TYPE | X1 COORDINATE | X2 COORDINATE | Y1 COORDINATE | Y2 COORDINATE |
|---|---|---|---|---|---|
| 3 | DOT BLUR | 1728 | 2095 | 1893 | 2297 |
| 3 | MAIN-SCANNING WHITE LINE | 950 | 2345 | 1136 | 3264 |
| 3 | VOID | 1734 | 2489 | 2159 | 2406 |
| ... | ... | ... | ... | ... | ... |

FIG.10

SEARCH

DATE AND TIME
OF PRINTING

START: [    ]   END: [    ]

DEFECT TYPE

◉ SELECT ALL

☐ NO DEFECT

☑ DOT BLUR

☐ VOID

☐ MAIN-SCANNING WHITE LINE

☐ MAIN-SCANNING COLORED LINE

☐ SUB-SCANNING WHITE LINE

☐ SUB-SCANNING COLORED LINE

JOB ID
[    ]

[ CLEAR ]   [ SEARCH ]

FIG.15

<CONTROL OR SETTING CORRESPONDING TO ABNORMALITY OR DEFECT>

| TYPE OF ABNORMALITY OR DEFECT | CONTROL OR SETTING REQUIRED FOR ELIMINATION |
|---|---|
| ·SUB-SCANNING COLORED LINE/ SUB-SCANNING WHITE LINE | EXECUTE "CHARGER CLEANING" |
| ·DOT BLUR | EXECUTE "REFRESH OF DEVELOPING MATERIAL" |
| | CHANGE SET VALUE OF "TEMPERATURE OF HEATING ROLLER" |
| | CHANGE SET VALUE OF "TEMPERATURE OF PRESSURE ROLLER" |
| | CHANGE SET VALUE FOR "FREQUENCY OF FIXING CLEANING" |

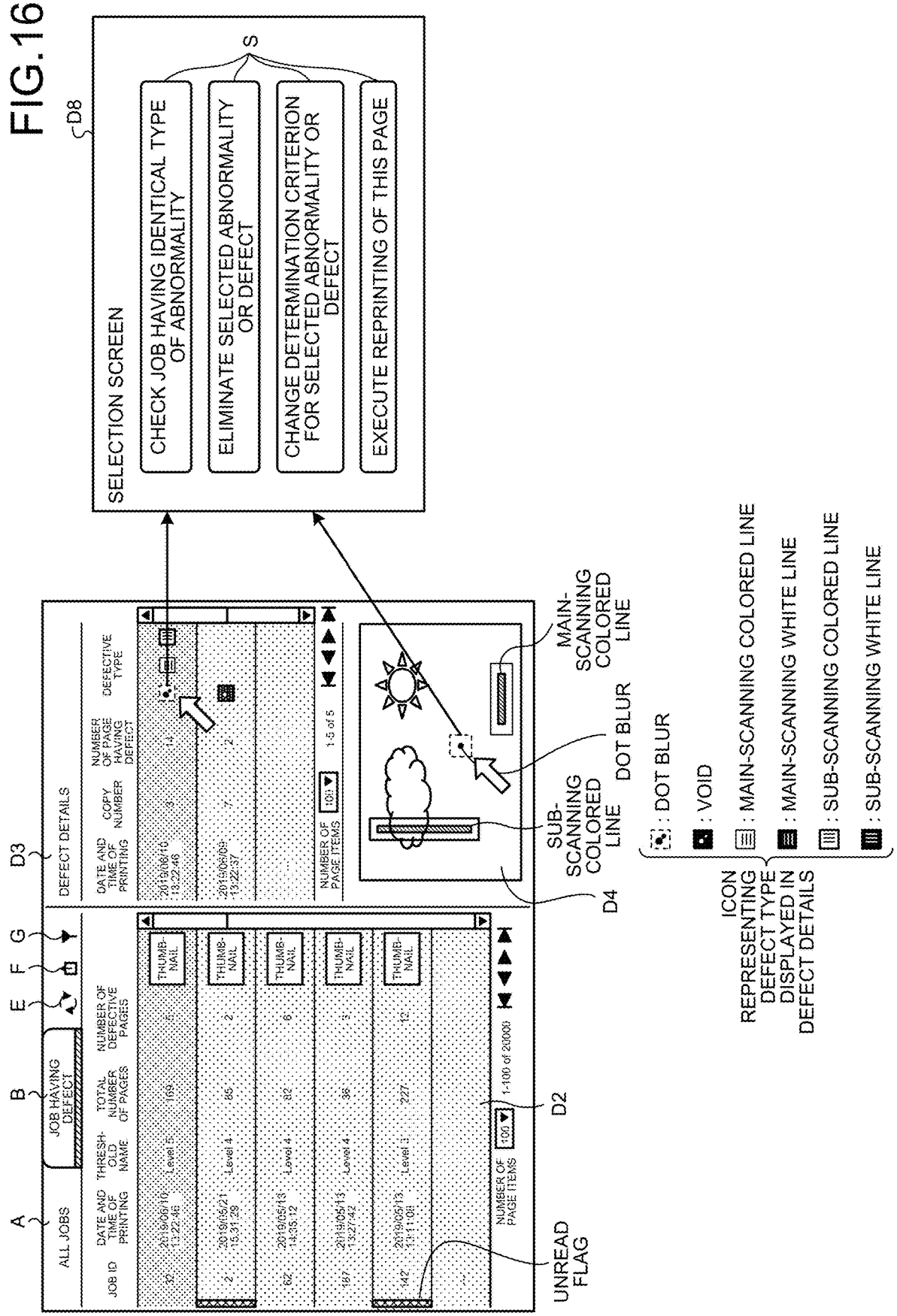

INFORMATION PROCESSING APPARATUS, INFORMATION PROCESSING SYSTEM, AND COMPUTER-READABLE MEDIUM

CROSS-REFERENCE TO RELATED APPLICATIONS

The present application claims priority under 35 U.S.C. § 119 to Japanese Patent Application. No. 2019-146302, filed on Aug. 8, 2019 and Japanese Patent Application No. 2020-109620, filed on Jun. 25, 2020. The contents of which are incorporated herein by reference in their entirety.

BACKGROUND OF THE INVENTION

1. Field of the Invention

The present invention relates to an information processing apparatus, an information processing system, and a computer readable medium.

2. Description of the Related Art

Conventionally, in production printing, there is demand for the checking to distinguish between a non-defective product and a defective product based on the presence or absence of a state abnormality or a defect with regard to a print output of printer. Therefore, for the production printing, there is a technology of a checking device, or the like, which checks whether the printing is properly executed in accordance with the result obtained by reading the print output of the printer with a line sensor, or the like, of a camera or a scanner.

Japanese Unexamined Patent Application Publication No. 2015-194484 discloses the technology in which, in order to change the threshold regarding the checking, the partial image that included in the read image and is determined to be defective in accordance with the previous checking result and the partial image that is included in the master image and located at the position corresponding to the partial image are extracted, the threshold is changed for the extracted partial image, the checking is executed again, the result of the rechecking is displayed, and then the threshold is further changed.

According to a conventional method for displaying a list of checking results, however, when a large number of different printed materials are printed, it is difficult to determine, at one view, which printed material includes a specific state abnormality or defect. Therefore, the conventional method for displaying a list of checking results has disadvantages such that it is difficult to find only a printed material including a state abnormality or a defect from the list and is difficult to execute narrowing-down with more detailed information.

SUMMARY OF THE INVENTION

According to an aspect of the present invention, an information processing apparatus includes circuitry configured to display a display screen. The display screen includes a first display or a second display, and a third display. The first display displays, in units of a print job, checking result information obtained by comparing a read result with reference data on an image to be formed on the recording medium. The read result is obtained by reading a recording medium having an image formed. The second display displays, among print jobs, only a print job including a page having at least one abnormality in the image formed on the recording medium based on the checking result information. The third display displays information about the page in the print job including the page having the at least one abnormality and abnormality type information indicating a type of the at least one abnormality present in the page.

BRIEF DESCRIPTION OF THE DRAWINGS

FIG. 6 is a flowchart illustrating the flow of a checking process in the checking device;

FIG. 7 is a table illustrating a DB generated by a DB generating unit of the server;

FIG. 10 is a diagram illustrating an example of a search dialogue;

FIG. 15 is a table in which each type of defect (abnormality) is associated with the control or the setting to be executed so as to eliminate the defect; and FIG. 16 is a diagram illustrating a situation where a selection screen is displayed when the type of specific defect (abnormality) is selected.

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
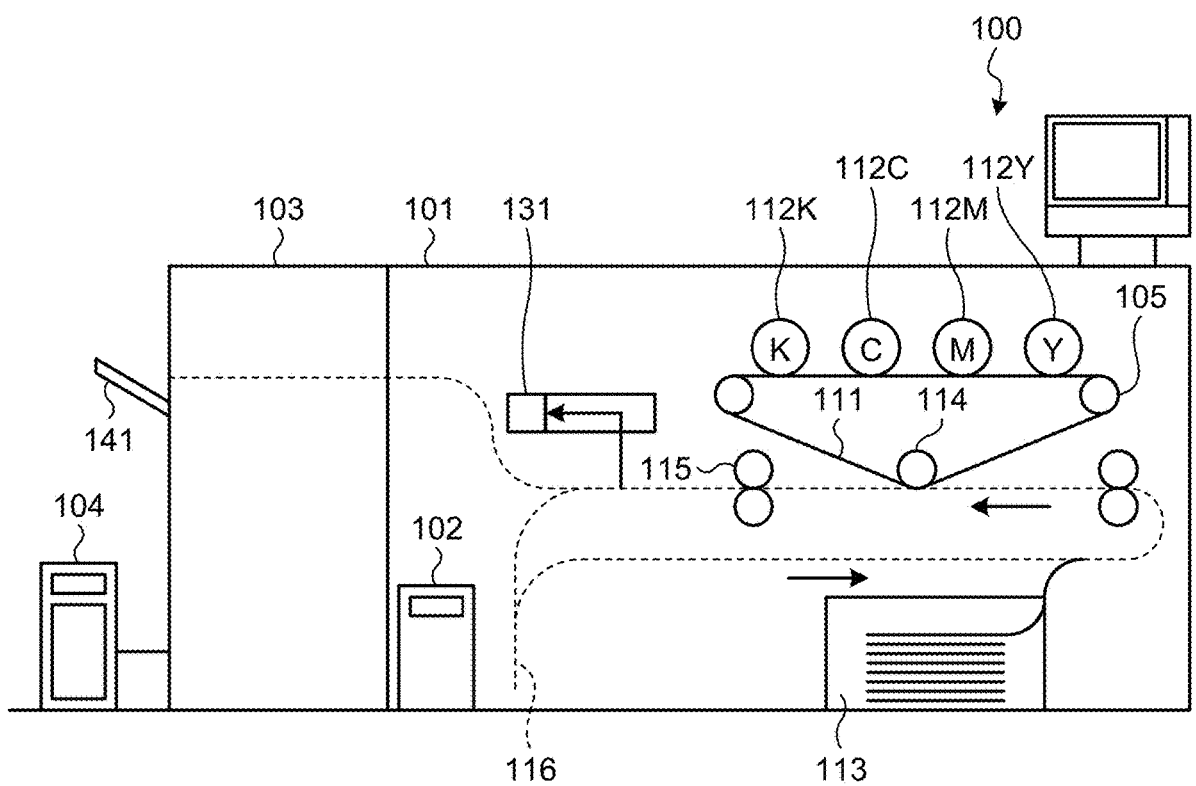
FIG. 1 is a diagram illustrating a configuration of an image forming system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to efficiently present a desired checking result to a user.

With reference to the accompanying drawings, an embodiment or an information processing apparatus, an information processing system, and a program is described below in detail.

FIG. 1 is a diagram illustrating a configuration of an image forming system 100 according to an embodiment. As illustrated in FIG. 1, the image forming system 100 includes a digital front end (DFE) 104, a printer 101, a checking device 102, and a stacker 103. The printer 101, is coupled to the DFE 104 and the checking device 102 via dedicated interfaces, respectively.

The DFE 104 is an image processing apparatus that generates the print data to be printed out on the basis of a received print job, i.e., the bitmap data that is the image output, and transmits the generated bitmap data to the printer 101.

The printer 101 controls a print engine 105 based on the bitmap data received from the DFE 104 so as to execute the image forming output. Furthermore, the printer 101 transmits the bitmap data received from the DFE 104 to the checking device 102 as the basic information of a master image that is referred to when the checking device 102 checks the result of the image forming output by the print engine 105. Furthermore, the printer 101 may print the information (the page ID or the page number described later) for identifying a page on each page of a printed material. Moreover, the printer 101 may automatically print the information for identifying a page on the margin (cut portion) if the setting is specified such that the page includes the margin.

The printer 101 is an image forming apparatus that executes the image forming output on a print sheet, which is a recording medium, based on the bitmap data. Further, a sheet-like material, such as a film or a plastic, which may be the target for the image forming output, other than the above-described print sheet, may be used as a recording medium.

The print engine 105 is of what is called a tandem type having the configuration in which photoconductor drums 112Y, 112M, 112C, and 112K (hereinafter collectively referred to as photoconductor drums 112) in respective colors are arranged along a conveyance belt 111 that is an endless moving unit. Specifically, the photoconductor drums 112Y, 112M, 112C, and 112K are arranged in order from the upstream side with respect to the conveying direction of the conveyance belt 111 along the conveyance belt 111 that is an intermediate transfer belt on which an intermediate transfer image is formed, which is to be transferred onto a sheet (an example of the recording medium) fed from a sheet feeding tray 113.

The black (K), cyan (C), magenta (M), and yellow (Y) toner images, developed by using toner on the surfaces of the photoconductor drums 112 in the respective colors, are transferred onto the conveyance belt 111 in a superposed manner to form a full-color image. The thus formed color image on the conveyance belt 111 is transferred onto the sheet surface of the sheet conveyed along the sheet convey- ance path indicated in a broken line in the drawing at the position closest to the path due to the function of a transfer roller 114.

Furthermore, although the description of the present embodiment is based on the assumption that the print engine 105 of the printer 101 includes an electrophotographic system, the present embodiment is not limited thereto, and it is obvious that the printer may use other systems such as an inkjet system.

The sheet having the image formed on its sheet surface is further conveyed so that the image is fixed by a fixing roller 115, and then the sheet conveyed to the checking device 102.

The checking device 102 includes a reading device 131. The reading device 131 reads each of the surfaces of the sheets conveyed through the fixing roller 115 to generate read images.

The checking device 102 acquires the read image that has been read by the reading device 131. Furthermore, the checking device 102 generates a master image, which is an example of reference data, based on the bitmap data that is directly input from the DFE 104 or input from the DFE 104 via the printer 101. Further, the checking device 102 may generate a master image from the read image that is obtained when the reading device 131 reads the image formed on the recording medium based on the bitmap data directly input from the DFE 104 or input from the DFE 104 via the printer 101. Then, the checking device 102 compares the generated master image described above with the read image that is generated when the reading device 131 reads the sheet output from the printer 101 so as to check the output result (check the image printed on the sheet that is a recording medium). The method for checking the output result is described later.

When the checking device 102 determines that there is a defect (abnormality) in the image on the sheet that is an output result during the checking, the checking device 102 notifies the printer 101 of the defect checking information that is checking result information including the defect page that is determined as a defect (abnormality). Accordingly, the printer 101 executes the reprinting control on the defect page. Furthermore, the printer 101 may perform the control so as to cancel the printing without executing the reprinting control on the defect page. Moreover, the checking device 102 transmits the defect checking information that is checking result information to a server 202 as described below so that the server 202 stores the information. The checking device 102 may include a server so that the server stores information to form a database.

In the case of one-sided printing, the sheet checked the checking device 102 is continuously elected to the stacker 103.

On the other side, in the case of two-sided printing, the sheet checked by the checking device 102 is conveyed to a turnover path 116 so as to be turned over and then transferred again to the transfer position of the transfer roller 114. After the sheet is conveyed to the transfer position of the transfer roller 114 again, a toner image is transferred onto and fixed to the side of the sheet opposite to the side where the one-sided printing has been performed. Then, the two-sided print sheet checked by the checking device 102 is ejected to the stacker 103.

The stacker 103 has the sheets discharged from the printer 101 stacked on a tray 141.

Figure 2:
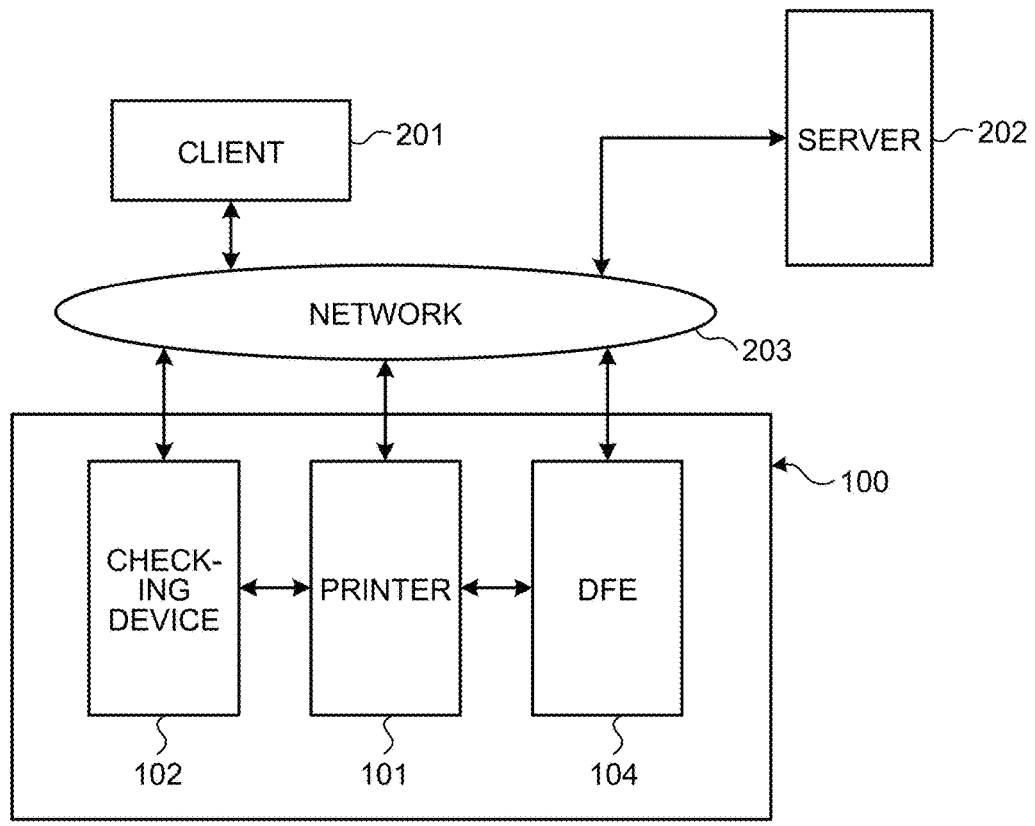
FIG. 2 is a block diagram schematically illustrating a configuration of an information processing system.

FIG. 2 is a block diagram schematically illustrating a configuration of an information processing system 200. As illustrated in FIG. 2, the information processing system 200 including the image forming system 100 includes a client 201 and the server 202 in addition to the image forming system 100.

Each unit (the DFE 104, the printer 101, and the checking device 102) of the image forming system 100 is connected to the client 201 and the server 202 via a network 203. Examples of the network 203 include a local area network (LAN) and the Internet.

The client 201 is an information processing apparatus having a communication function and a content output function. The client 201 is various terminal devices such as a personal computer (PC) or a tablet terminal. The client 201 transmits a print job to the DFE 104 via the network 203. The client 201 displays a checking result of the checking device 102. The client 201 includes a web browser. The client 201 accesses the server 202 described later via the network 203. The client 201 acquires and displays the checking result information (defect checking information) saved and stored in the server 202 as display screen information (e.g., HTML file) and also receives a user's operation to the display screen on the web browser. The DFE 104 may receive a print job from the client 201 and also receive a print job from the printer 101 and the checking device 102 via the network 203.

The server 202 receives defect checking information transmitted from the checking device 102 via the network 203. The server 202 generates a database (DB) based on the received defect checking information. The server 202 stores the generated DB. The server 202 transmits and receives data to and from the client 201 via the network 203. The server 202 may be included in the checking device 102.

Figure 3:
FIG. 3 is a diagram illustrating the flow of a processing operation by the information processing system.

FIG. 3 is a diagram illustrating the flow of a processing operation by the information processing system 200. As illustrated in FIG. 3, the information processing system 200 including the image forming system 100 performs a printing process (Step S1) in the printer 101, a checking process (Step S2) in the checking device 102, a DB generation process (Step S3) in the server 202, a DB storing process (Step S4) in the server 202, and a UI display process (Step S5) in the server 202. Details of the process in each unit are given later.

Here, the hardware forming each control unit of the printer 101, the checking device 102, the DFE 104, the client 201, and the server 202 according to the present embodiment is described.

Figure 4:
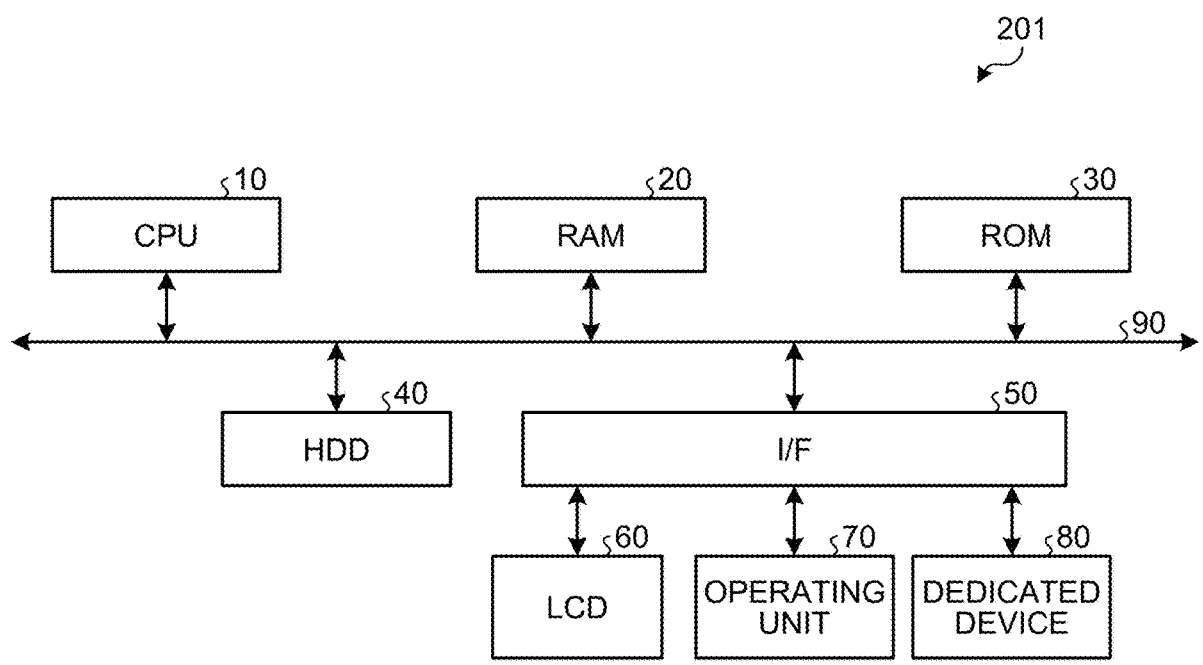
FIG. 4 is a block diagram illustrating a hardware configuration of a control unit of a client.

FIG. 4 is a block diagram illustrating a hardware configuration of a control unit of the client 201. FIG. 4 illustrates the hardware configuration of the control unit of the client 201; however, the control unit of the printer 101, the control unit of the DFE 104, the control unit of the checking device 102, and the control unit of the server 202 are the same.

As illustrated in FIG. 4, the control unit of the client 201 according to the present embodiment has the configuration that is the same as that of a general purpose personal computer (PC), server, or the like. Specifically, the control unit of the client 201 according to the present embodiment includes a central processing unit (CPU) 10, a random access memory (RAM) 20, a read only memory (ROM) 30, a hard disk drive (HDD) 40, and an I/F 50, which are coupled via a bus 90. The I/F 50 is coupled to a liquid crystal display (LCD) 60, an operating unit 70, and a dedicated device 80.

The CPU 10 is an arithmetic unit to control the overall operation of the client 201. The RAM 20 is a volatile storage medium capable of reading and writing information at a high speed and is used as a work area when the CPU 10 processes information. The ROM 30 is a read-only non-volatile storage medium to store a program such as firmware. The HDD 40 is a non-volatile storage medium that is capable of reading and writing information and stores the operating system (OS), various control programs, application programs, a Web browser, etc.

The I/F 50 controls the connection between the bus 90 and various types of hardware, a network, etc. The LCD 60 is a visual user interface for the user to check the state of the client 201. The operating unit 70 is a user interface, such as a keyboard or a mouse, for the user to input information to the client 201.

The dedicated device 80 is the hardware for performing a dedicated function in the printer 101, the checking device 102, the DFE 104, the client 201, or the server 202 and, in the case of the inter 101, is a conveyance mechanism that conveys a sheet that is the target for the image forming output or a plotter device that performs the image forming output on a sheet surface. In the case of the checking device 102, the dedicated device 80 is an arithmetic device dedicated for high-speed image processing. This kind of arithmetic device is configured as, for example, an application specific integrated circuit (ASIC). The reading device 131, which reads the image output to the sheet surface, is also implemented by using the dedicated device 80.

In this hardware configuration, the CPU 10 performs arithmetic operation in accordance with a program stored in the ROM 30 or a program loaded into the RAM 20 from the HDD 40 or a recording medium (not illustrated) such as an op disk so as to configure a software control unit. The combination of the thus configured software control unit and the hardware forms the functional block performing the functions of the printer 101, the checking device 102, the DFE 104, the client 201, and the server 202 according to the present embodiment.

Figure 5:
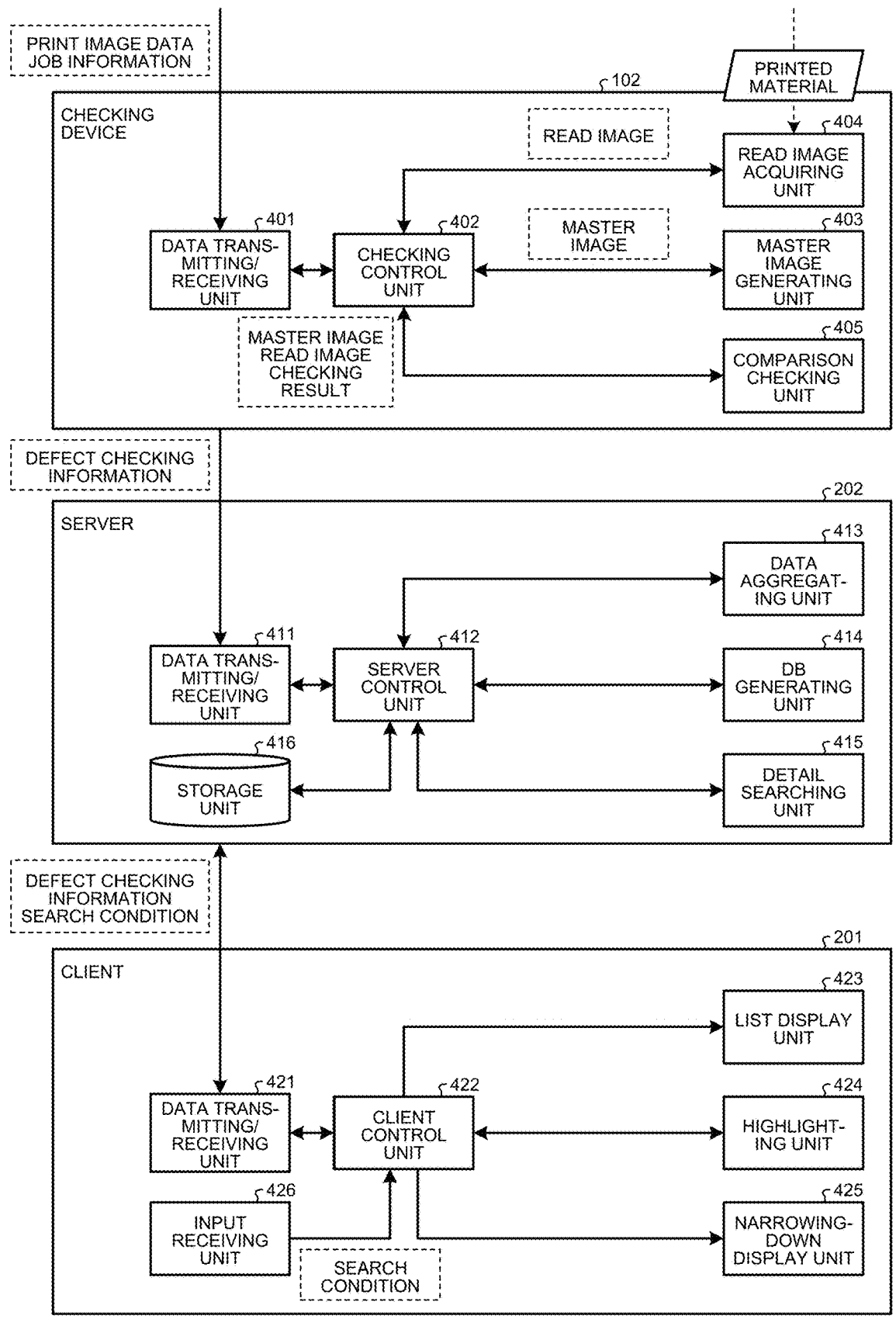
FIG. 5 is a block diagram illustrating a functional configuration of a checking device, a client, and a server.

FIG. 5 is a block diagram illustrating an example of the functional configuration of the checking device 102, the client 201, and the server 202. In FIG. 5, a solid line indicates the flow of data for control, and a dashed line indicates the flow of the image data for a printed material and the defect checking information.

First, a functional configuration of the checking device 102 is described.

As illustrated in FIG. 5, the checking device 102 includes a data transmitting/receiving unit 401, a checking control unit 402, a master image generating unit 403, a read image acquiring unit 404, and a comparison checking unit 405. The checking control unit 402 is a control unit that controls the overall operation of the checking device 102. Each component included in the checking device 102 operates under the control of the checking control unit 402.

FIG. 6 is a flowchart illustrating the flow of the checking process in the checking device 102. The checking device 102 compares a reference master image with a read image, which is the target to be checked, to check a defect.

As illustrated in FIG. 6, the data transmitting/receiving unit 401 of the checking device 102 acquires the print image data and the print page information (job information) that is transmitted directly from the DFE 104 or transmitted from the DFE 104 via the printer 101 (Step S11).

The master image generating unit 403 generates a master image from the print image data or the read image (Step S12).

The read image acquiring unit 404 acquires, from the checking device 102, the image obtained when the reading device 131 reads the print sheet that is the target to be checked (Step S13).

The comparison checking unit 405 acquires the master image and the read image, compares the two images with each other, and checks the sheet output result to determine a defect (Step S14). The method for determining a defect is as described below. First, the comparison checking unit 405 compares the master image with the read image to extract all the areas (i.e., all the pixels that are defect candidates) of the read image that is different from the master image. Based on the condition corresponding to each of various defects (a dot blur, a void, a main-scanning colored line, a main-scanning white line, a sub-scanning colored line, a sub-scanning white line, etc.) and the set coefficient (defect level), the comparison checking unit 405 further determines that a partial area that matches the condition with the coefficient added in all the defect candidate areas is a defective area. The condition corresponding to a defect is previously defined based on the pixel density difference threshold, the area threshold, etc. Each threshold and coefficient may be changed by the user, or the like, as appropriate.

The data transmitting/receiving unit 401 transmits the checking result as defect checking information to the server 202 via the network 203 (Step S15). The defect checking information is, for example, the information about the page having the defective area determined as described above, and each piece of information is transmitted in a related manner and is stored in the server 202. Details are given later with reference to FIG. 7.

The process from Step S12 to Step S16 is repeatedly performed until the process is finished for all the pages (Yes at Step S16).

Next, a functional configuration of the server 202 is described.

As illustrated in FIG. 5, the server 202 includes a data transmitting/receiving unit 411, a server control unit 412, a data aggregating unit 413, a DB generating unit 414, a detail searching unit 415, and a storage unit 416. The server control unit 412 is a control unit that controls the overall operation of the server 202. Each component included in the server 202 operates under the control of the server control unit 412.

The data transmitting/receiving unit 411 of the server 202 acquires the defect checking information transmitted from the checking device 102. The defect checking information acquired from the checking device 102 is in units of a page and needs to be aggregated in units of a job so as to be displayed as a list on the UI. Therefore, the data aggregating unit 413 aggregates the pieces of defect checking information in units of a page on an identical-job basis. When the pieces of defect checking information acquired from the checking device 102 are aggregated in units of a job, the data aggregating unit 413 does not need to aggregate the pieces of defect checking information in units of pages on an identical-job basis.

The DB generating unit 414 generates the DBs regarding the job information, the page information, and the page defect detail information, respectively, by using for example the defect checking information in units of a page acquired from the checking device 102 and the information obtained when the data aggregating unit 413 aggregates the pieces of defect checking information in units of a job. The DB generating unit 414 adds or updates the information by using information such as the user's browsing result of the defect checking information.

The detail searching unit 415 searches for the corresponding defect checking information in the DB based on the detail information such as the date and time of printing and the type of defect.

The storage unit 416 stores the defect checking information such as the generated DB, the read image, and the master image.

The data transmitting/receiving unit 411 transmits the defect checking information to the client 201 via the network 203.

Here, FIG. 7 is a table illustrating a DB generated by the DB generating unit 414 of the server 202.

FIG. 7 illustrates, at (a), the information (job log) on the print job on which the checking has been performed. The DB of the job log illustrated at (a) in FIG. 7 includes information such as the set ID that is a unique character string assigned to each job, the job ID, the date and time of printing of the last printed page, the threshold preset name used for checking, the total number of pages, a read/unread flag (0 for read and 1 for unread) indicating whether the print job has been viewed by the user on the UI, and the storage path for a thumbnail image (the image of the first page of the job) obtained by reducing the size of the read image. The job ID, the set ID, and the like, may be referred to as job identification information for identifying a job. The other pieces of information may be referred to as the information regarding a job. The set ID and the job ID may be discriminated from each other in that, for example, the set ID is the identification information assigned at the side of a single external device (the DEF, the PC, etc.) and the job ID is the identification information assigned at the side of the checking device or the printer, which receive the jobs, with regard to all the jobs received from a plurality of external devices.

FIG. 7 illustrates, at (b), the information (page log) on each page on which the checking has been performed. The DB of the page log illustrated at (b) in FIG. 7 includes information such as the page ID sequentially assigned to each page, the time and date of printing, the number of a copy, the page number of the page having a defect, the set ID of the job including the page, and the storage path of the read image in each page. The page ID and the page number may be distinguished from each other in that the page ID is the identification information that is different for each page in the entire job and the page number is the identification information on a page in each of the copies in the job.

FIG. 7 illustrates, at (a), the defect information (defect log) of a page in which a defect is detected. The DB of the defect log illustrated at (c) in FIG. 7 includes information such as the page ID (or the page number) of the page in which a defect is detected, a defect type indicating the type of defect (abnormality) of an image, and the X coordinate/Y coordinate (positional information) of a rectangular region of a pixel group that is determined to be a defect. The type of defect may be referred to as the kind of defect, the type of abnormality, or the kind of abnormality and is the information indicating the kind of defect at the position that is determined to be a defect (abnormality) position in the output image.

FIG. 7 is merely an example, and items such as the level of defect indicating the degree of difference from the reference value that is set as a defect condition or the value of density unevenness may be included.

Next, a functional configuration of the client 201 is described.

As illustrated in FIG. 5, the client 201 includes a data transmitting/receiving unit 421, a client control unit 422, a list display unit 423, a highlighting unit 424, a narrowing-down display unit 425, and an input receiving unit 426. The client control unit 422 is a control unit that controls the overall operation of the client 201. Each component included in the client 201 operates under the control of the client control unit 422.

The data transmitting/receiving unit 421 of the client 201 acquires the defect checking information transmitted from the server 202.

The list display unit 423 functions as a display unit to display the acquired defect checking information as a list in the units of jobs on the UI.

The highlighting unit 424 detects and highlights the job including the page having a defect.

The narrowing-down display unit 425 displays a search screen, executes search based on the input detail information (search condition), and displays the result matching the detailed information. The list display unit 423 displays the search results as a list of narrowed down jobs. The search screen of the narrowing-down display unit 425 may display a search result.

The input receiving unit 426 acquires a search condition that is input through an input form, or the like, when search is executed based on the detailed information.

The data transmitting/receiving unit 421 transmits the acquired search condition to the server 202 via the network 203 so that the detail searching unit 415 of the server 202 uses the search condition.

The list display unit 423, the highlighting unit 424, the narrowing-down display unit 425, the input receiving unit 426, and the like, are implemented by using the web browser included in the client 201 and the screen information (HTML and JavaScript (registered trademark)) acquired from the server 202 and displayed on the web browser. The client 201 may include a dedicated application, and the dedicated application may be used to refer to the server 202 for display. The web browser or the application displaying the screen information may be a display unit of the client 201. The display unit causes the LCD 60 or the operating unit 70 of the client 201 to display the screen information.

Figure 8A:
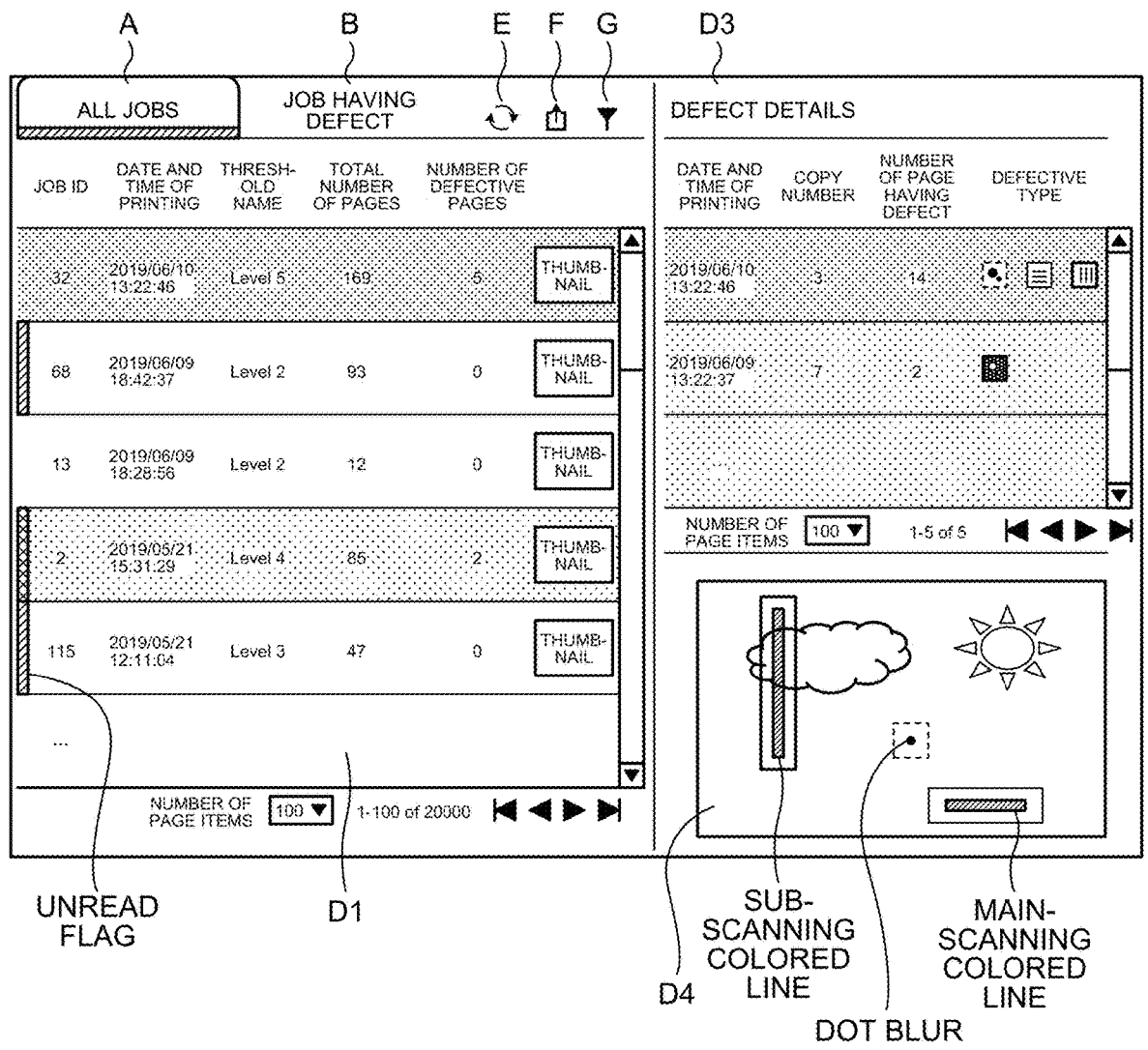
FIG. 8A is a diagram illustrating an example of a UI in which a list display unit of the client displays a list of pieces of defect checking information.
Figure 8B:
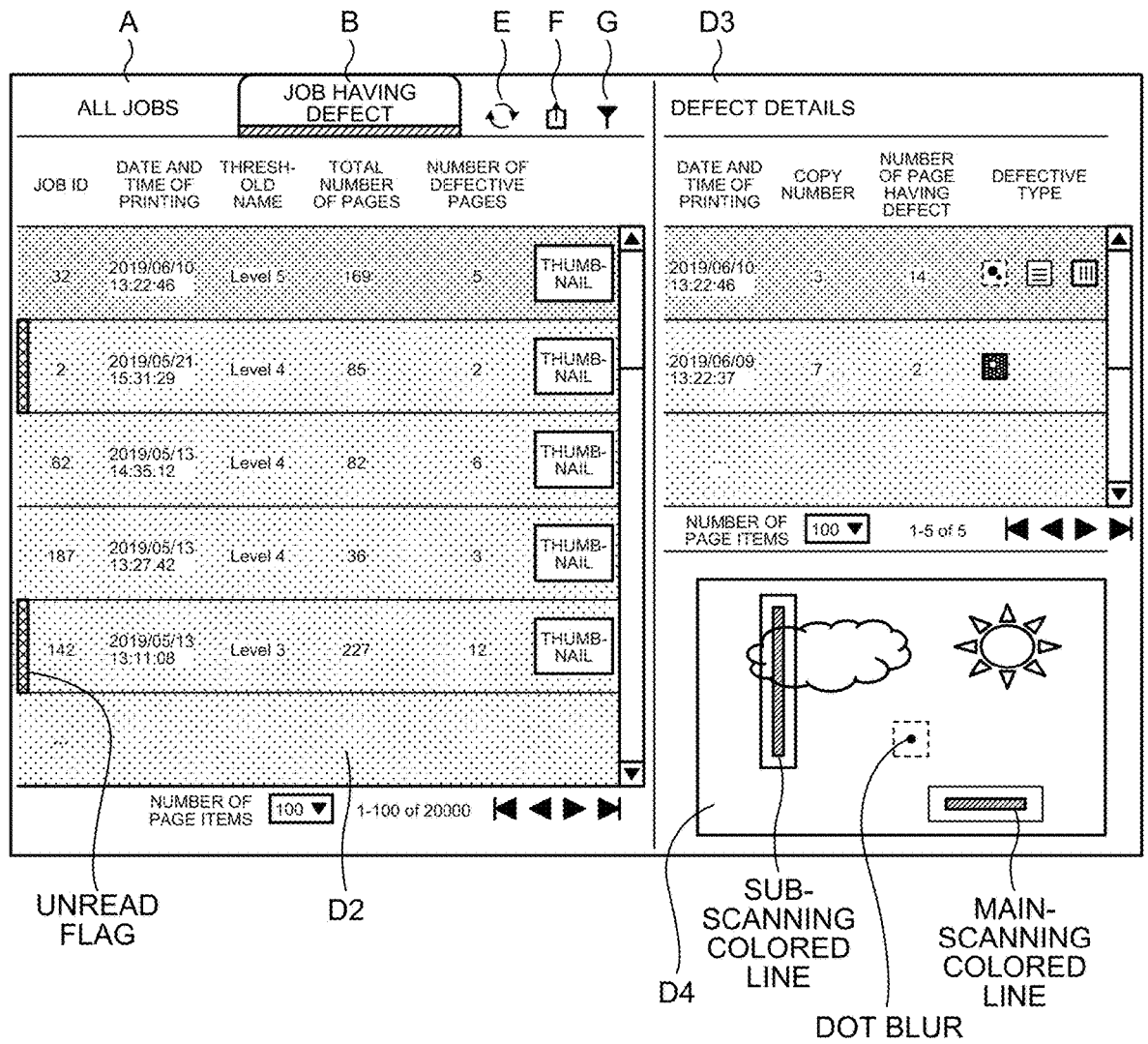
FIG. 8B is a diagram illustrating an example of a UI in which the list display unit of the client displays a list or pieces of defect checking information.

FIGS. 8A and 8B are diagrams illustrating examples of the UI in which the list display unit 423 of the client 201 displays a list of pieces of defect checking information stored in the storage unit 416 of the server 202.

On the UI illustrated in FIGS. 8A and 8B, the left side of the screen displays a list of pieces of information (the information about a job, such as the job ID, the date and time of printing, the threshold name, the total number of pages, the number of defective pages (the number of entries of the page log), the thumbnail preview image, or the read/unread flag) aggregated in units of a job. The information about a job may be displayed together with the information indicating as to in which job the page identification information is printed on a printed material or as to whether it is not printed. It may be displayed together with, for example, the information for identifying the job in which the printing of the page identification information is set, or the information for identifying the job in which the margin to be cut is set on a sheet and the page identification information is printed on the margin. The unread flag is displayed at the end of the row in each job. According to the present embodiment, the color of the unread flag is changed in a case where there is a defect and in a case where there is no defect. The thumbnail preview image may be the thumbnail of a defective image. On the UI illustrated in FIGS. 8A and 8B, the items other than thumbnails may be sorted in ascending order or in descending order.

A row of each job is highlighted in, for example, a darker background color in a case where there is a defect. The color density for highlighting may be changed depending on the level of a defect. This makes it easier to distinguish between the levels.

The screen on the left side of the UI illustrated in FIG. 8A is an example of the screen displayed by the list display unit 423 and is a screen D1 (first display) in which an "all jobs" tab A is selected to display the defect checking information on all the print jobs on a print-job basis. The screen on the left side of the UI illustrated in FIG. 8B is an example of the screen displayed by the list display unit 423 and is a screen D2 (second display) in which a "defective jobs" tab B is selected to display the defective print jobs.

The UI illustrated in FIGS. 8A and 8B is an example of the screen displayed by the list display unit 423, and the screen on the right side displays a detail display screen D3 (third display) for a defective page included in each job. The detail display screen D3 for a defective page displays the date and time of printing of the defective page, the number of the copy of the defective page (the number of the copy including the defective page when multiple copies of the identical document are printed in a single job), the page number of the defective page, and the icon indicating the type of defect included. The types of icon include, for example, a dot blur, a void, a main-scanning colored line, a main-scanning white line, a sub-scanning colored line, or a sub-scanning white line.

The information regarding a page having a defect (abnormality) includes, for example, the date and time of printing of the above-described defective page, the number of the copy having the defective page, or the page number of the defective page. For example, the information regarding a page having the defect (abnormality) is the information for narrowing down or identifying a defective page. The page number of the defective page may be the page ID through a single job or the page number in the copy having a defect (the number of the defective page in the number of the copy including the defective page within a single job). The page ID, the page number, and the like, may be referred to as the page identification information for identifying the page. As the page having a defect is displayed, it is easy to find the defective page from the printed material in a case where the page identification information is printed on each page of the printed material.

The screen D3 of the UI illustrated in FIGS. 8A and 8B displays a screen D4 (fourth display) where the read image of a defective page is previewed under the display of the list when the row of the defective page in the defect details is selected. With regard to each type of defect, a defect included in the read image is surrounded by a color frame in the same color as that of the color frame of the corresponding defect-type icon.

As the read images for all the pages in all the jobs are stored, the screen D4 may display a defect-free page as well as a defective page. When a defective page in a certain job is displayed on the screen D4 and then a different job is selected on the screen D1 or the screen D2, the page with the same page ID (page number) in the different job may be displayed on the screen D4. It is possible to easily compare the types, the statuses, and the levels of one or more defects in the same page across a plurality of jobs.

The display items on the UI illustrated in FIGS. 8A and 8B are only examples, and items such as the level of a defect or the value of density unevenness may be displayed.

Figure 9:
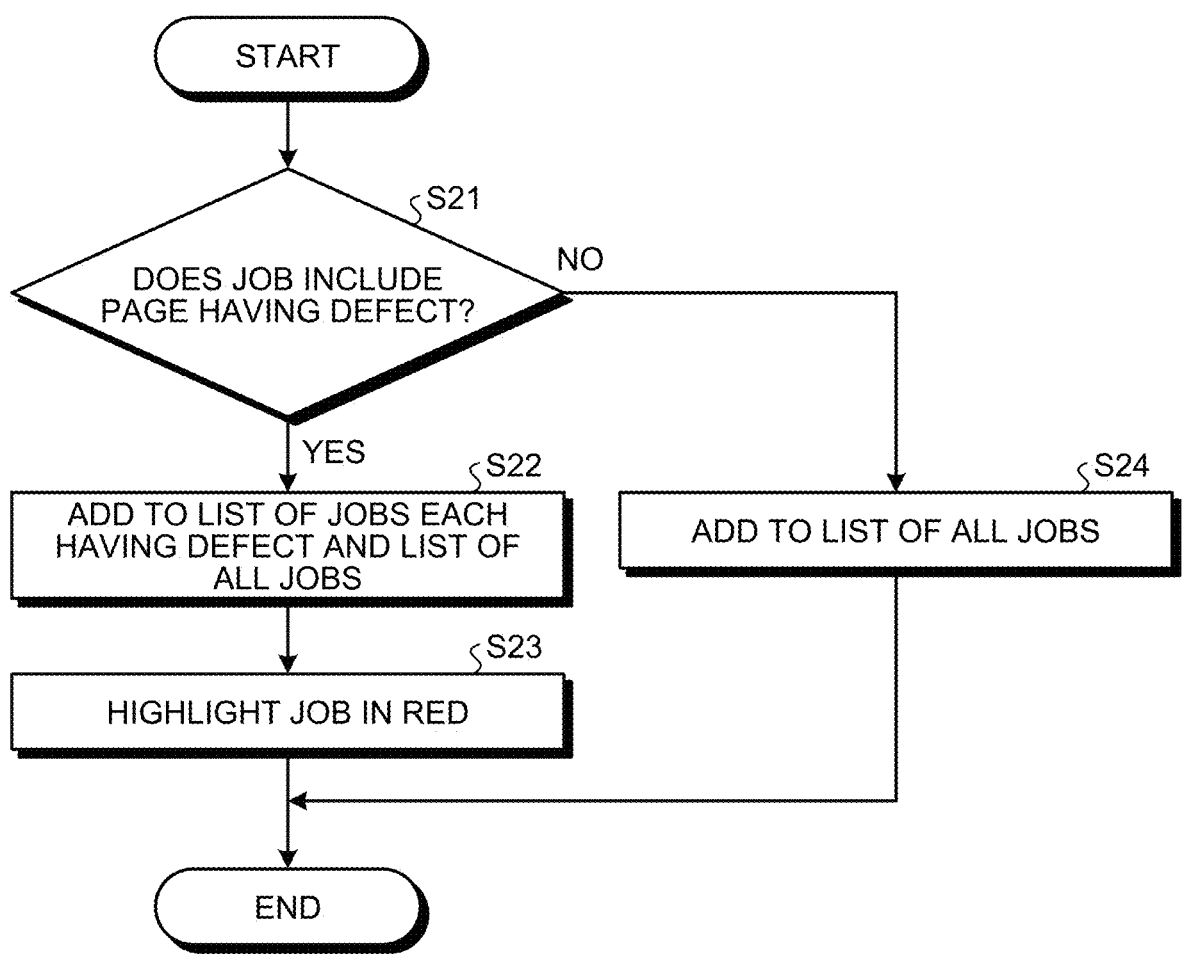
FIG. 9 is a flowchart illustrating the flow of the display by the list display unit and a highlighting unit of the client.

FIG. 9 is a flowchart illustrating the flow of the display by the list display unit 423 and the highlighting unit 424 of the client 201. As illustrated in FIG. 9, the list display unit 423 first determines whether the jobs in the defect checking information (see FIG. 7) include a defective page (Step S21).

When it is determined that a defective page is included (the number of defective pages is one or more) (Yes, at Step S21), the list display unit 423 adds it to the list on the screen D1 where the "all jobs" tab A in FIG. 8A is selected and the screen D2 where the "defective jobs" tab B in FIG. 8B is selected (Step S22).

Then, the highlighting unit 424 highlights the job added to the list (for example, in red) illustrated in FIGS. 8A and 8B (Step S23).

On the other hand, when it is determined that no defective page is included (No at Step S21), the list display unit 423 makes addition only the screen D1 where the "all jobs" tab A in FIG. 8A is selected and does not highlight it (Step S24).

Unread flags illustrated in FIGS. 8A and 8B are displayed on the left end at a row that has not been read (not been selected once) in the defect checking information displayed as a list.

After the row of the (highlighted) job having a defect is selected (highlighted in a darker color) on the screen D1 and the screen D2 of the UI illustrated FIGS. 8A and 8B, the detailed information on a defective page is displayed on a page basis in the defect details on the detail display screen D3 for the defective page on the UI illustrated in FIGS. 8A and 8B.

In addition, the UI illustrated in FIGS. 8A and 8B includes an update button E, an export button F, and a search button G.

When the update button F illustrated in FIGS. 8A and 8B is pressed, the list display unit 423 adds the newly stored defect checking information to the list and displays it as a list. By selecting the defect checking information that is displayed as a list on a job basis and pressing the export button F illustrated in FIGS. 8A and 8B, the detailed information on each page may be downloaded in a file format such as HTML.

After the search button G illustrated in FIGS. 8A and 8B is pressed, the input receiving unit 426 displays a search dialogue D5. FIG. 10 is a diagram illustrating an example of the search dialogue D5. The search with the search dialogue D5 illustrated in FIG. 10 allows the narrowing-down display unit 425 to perform narrowing down display of the list illustrated in FIGS. 8A and 8B.

The search dialogue D5 illustrated in FIG. 10 is an example of the narrowing-down display (search screen) that is displayed by the narrowing-down display unit 425, and an input form H, a check box I, and a slide toggle J on the search dialogue D5 are used to receive the designation of a detailed search condition such as the date and time of printing (the designation of the date and time for searching the defect checking information that is checked in a predetermined period of time), the type of defect, the job ID, etc. Multiple types of defect may be selected from "no defect", "dot blur", "void", "main-scanning white line", "main-scanning colored line", "sub-scanning white line", "sub-scanning colored line", etc. The slide toggle J is used to select all the check boxes.

As illustrated in FIG. 10, the search dialogue D5 is an example of the narrowing-down setting display and includes: clear button for clearing a search condition; a search execution button L for executing a search; and a close button M for closing the dialogue. The designated detailed information is cleared when the clear button K is pressed, and the search dialogue is closed when the close button is pressed.

The search dialogue D5 illustrated in FIG. 10 is merely an example and may include the search using detailed information such as a threshold name or read/unread.

Figure 11:
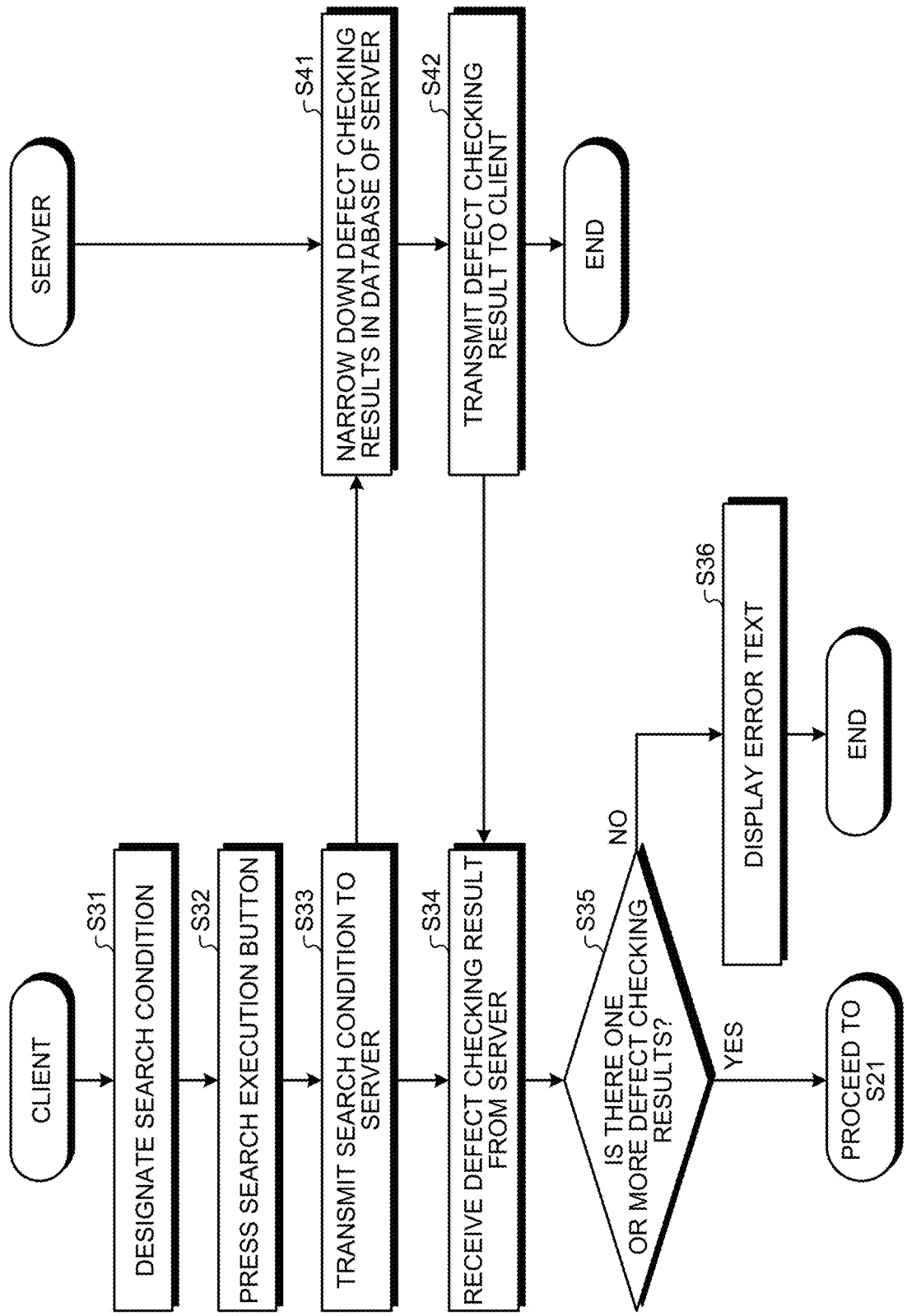
FIG. 11 is a flowchart illustrating the flow of a search process.

FIG. 11 is a flowchart illustrating the flow of a search process. As illustrated in FIG. 11, the input receiving unit 426 of the client 201 first receives the designation of a detailed search condition such as the date and time of printing (the designation of the date and time for searching the defect checking information that is checked in a predetermined period of time), the type of defect, or the job ID by using the input form H or the check boxes I on the search dialogue D5 (Step S31).

Then, the input receiving unit 426 of the client 201 receives the pressing of the search execution button L on the search dialogue D5 (Step S32).

Subsequently, the data transmitting/receiving unit 421 of the client 201 transmits the designated search condition to the server 202 via the network 203 (Step S33).

Then, the detail searching unit 415 of the server 202 narrows down defect checking results based on the designated search condition (Step S41).

Subsequently, the data transmitting/receiving unit 411 of the server 202 transmits a narrowed down defect checking result to the client 201 via the network 203 (Step S42).

The data transmitting/receiving unit 421 of the client 201 receives the defect checking result from the server 202 (Step S34).

Then, the narrowing-down display unit 425 of the client 201 determines whether there is a defect checking result (Step S35). When there are (one or more) defect checking results (Yes at Step S35), the narrowing-down display unit 425 of the client 201 proceeds to Step S21 illustrated in FIG. 9.

On the other hand, when it is determined that there is no (zero) defect checking result (No at Step S35), the narrowing-down display unit 425 of the client 201 displays an error text such as "there is no result that matches the search condition" (Step S36).

Figure 12:
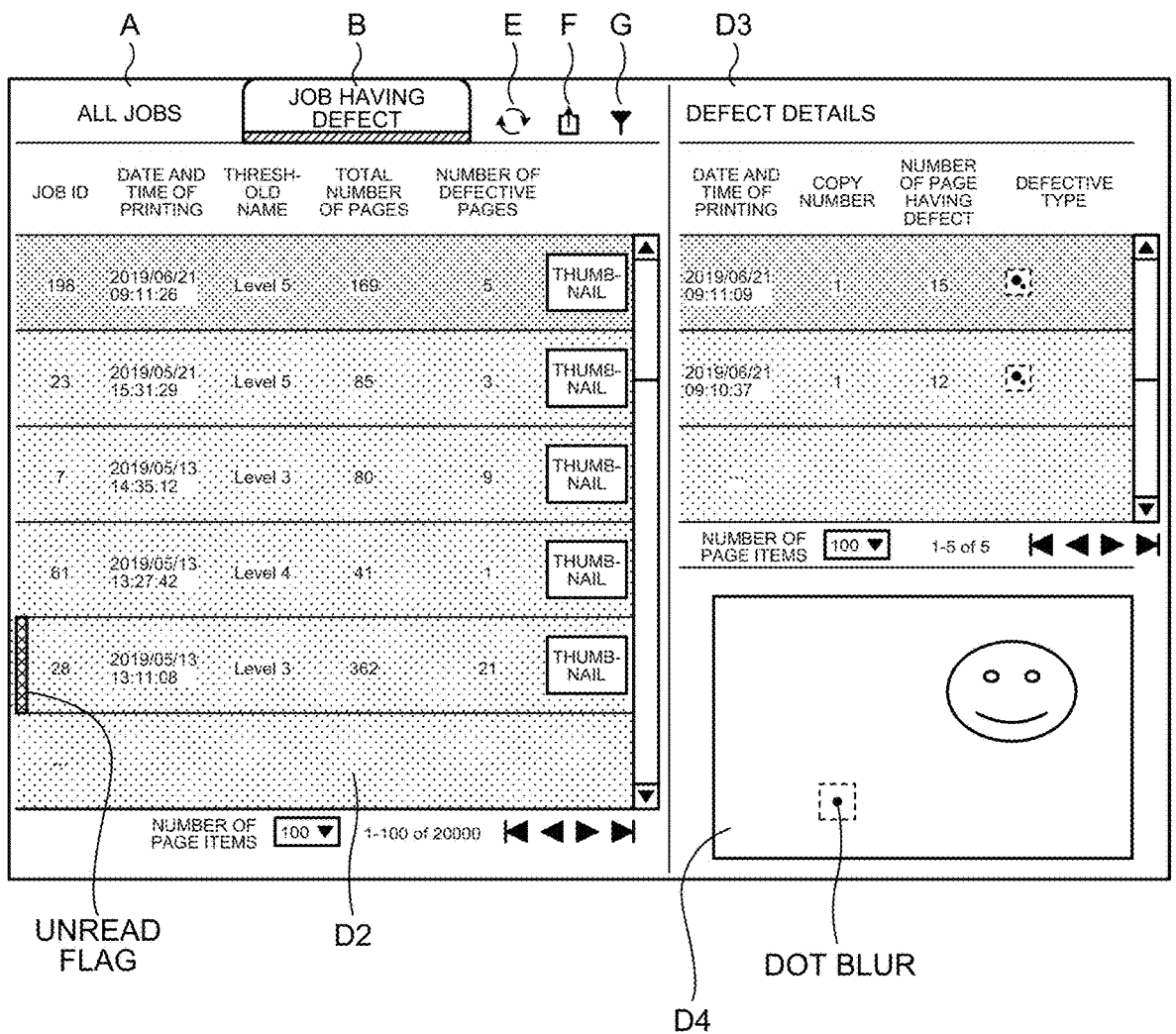
FIG. 12 is a diagram illustrating an example of a narrowing-down display.

FIG. 12 is a diagram illustrating an example of the narrowing-down display. The example illustrated in FIG. 12 is an example of the narrowing-down display in a case where the type of defect "dot blur" is designated on the search dialogue D5 and the search execution button L is pressed. This makes possible to efficiently present the defect checking information desired by the user.

Figure 13:
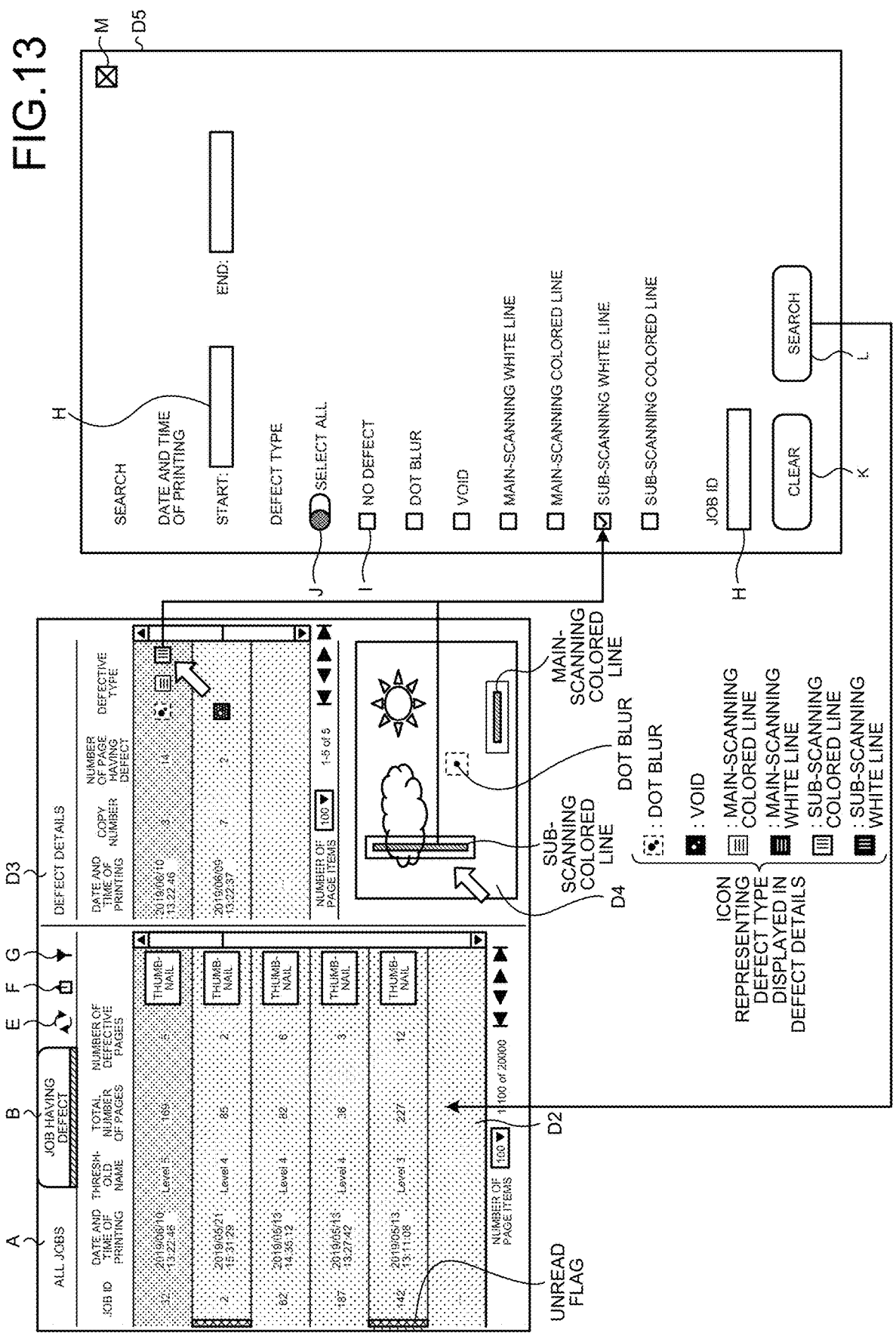
FIG. 13 is a diagram illustrating a situation where a search screen is displayed when the type of specific defect (abnormality) is selected.

FIG. 13 is a diagram illustrating a situation where a search screen is displayed when the type of specific defect (abnormality) is selected on the detail display screen D3 (third display) illustrated in FIGS. 8A and 8B or the screen D4 (fourth display) that previews the read image of each page.

A display unit (a web browser, etc.) of the client 201 selectively displays the icon representing the type of specific defect on the third display or the position of a specific defect in the preview image on the fourth display. The narrowing-down display unit 425 displays the search dialogue D5 (search screen), which is a narrowing-down setting display, when the operation to select the specific icon or the position or the specific defect in the preview image is received. Although the screen of the displayed search dialogue D5 is the same as the screen displayed when the search button G is pressed, the search dialogue D5 is displayed in such a manner that the selectin button for the selected specific defect has been automatically selected and the condition for narrowing-down on the search dialogue D5 (narrowing-down setting display) is changeable.

The state where the condition for narrowing-down is changeable refers to the state where all the narrowing-down conditions including the automatically selected type of defect are selectable. Thus, for example, it is possible to conduct search after the conditions are changed as appropriate, for example, the range of the date of the executed job Jr the addition of the type of defect, whereby appropriate narrowing down is possible before the execution of the search so that a large number of search results are not extracted.

The search dialogue D5 is implemented by using JavaScript, or the like, included in the screen information acquired by the web browser from the server 202. After the search dialogue D5 executes the search, the server 202 conducts search and returns search results to the web browser, and then the list of jobs (for example, the jobs that include the page having the specific defect selected on the third display or the fourth display and that are executed within a predetermined period of time under the condition set on the search dialogue D5) as narrowing-down results is displayed in the first display and the second display.

When the operation to select a specific icon on the third display or the position of a specific defect in the preview image on the fourth display is received, the list of jobs (the jobs including the page having the selected specific defect) may be displayed on the first display and the second display without displaying the search dialogue D5.

There may be an enormous number of jobs in a list; therefore, when the search dialogue D5 or the list of jobs is displayed, the range to be displayed may be automatically narrowed down to only the jobs within a predetermined period of time or to only the jobs after the setting is changed in the printer 101 as described later.

Figure 14:
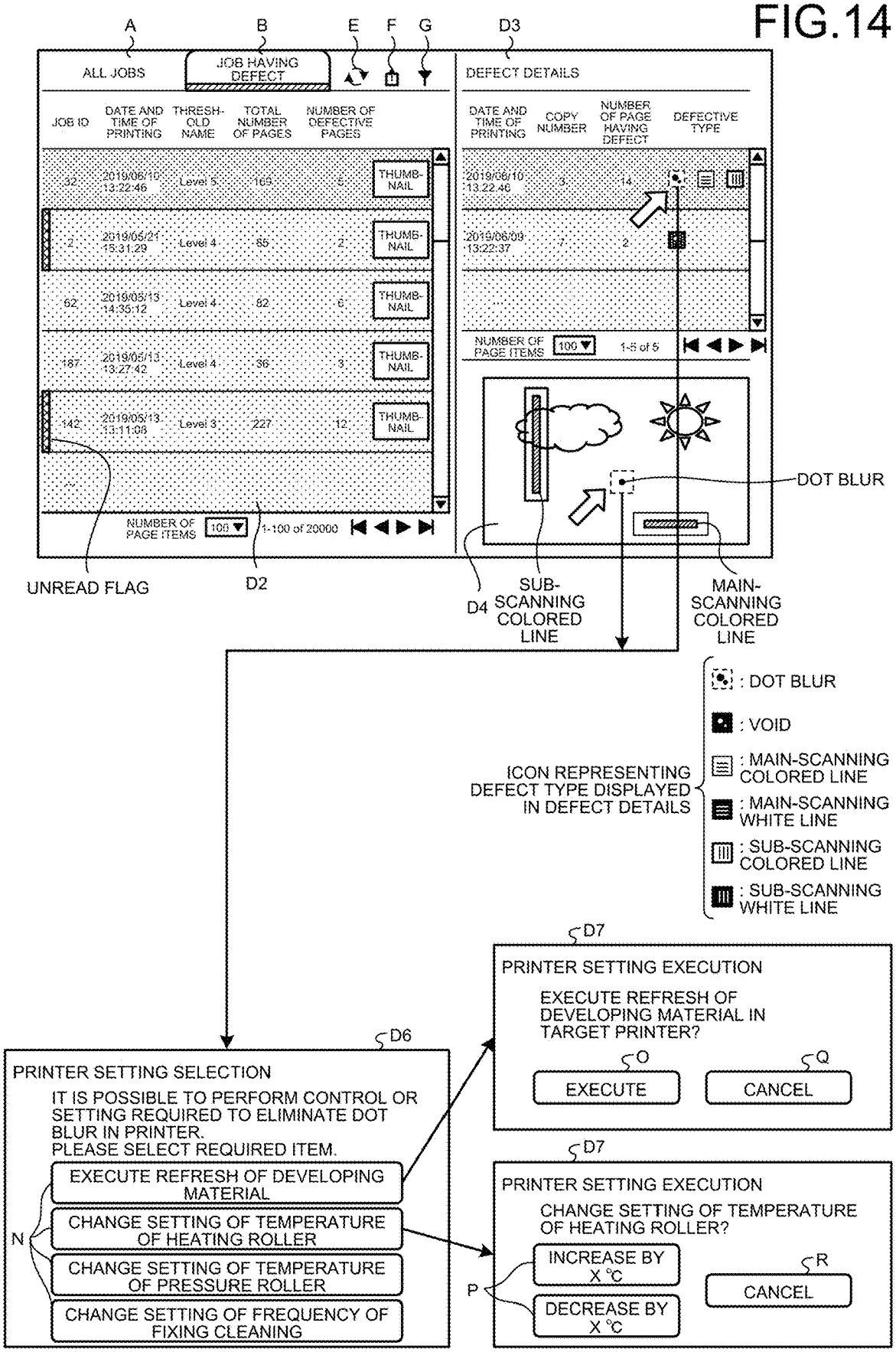
FIG. 14 is a diagram illustrating a situation where a setting screen is displayed when the type of the specific defect (abnormality) is selected.

FIG. 14 is a diagram illustrating the situation where a setting screen D6 is displayed to perform a predetermined control or change the set value to eliminate a specific defect (abnormality) with the printer 101, or the like, when the type of the specific defect (abnormality) is selected on the third display or the fourth display illustrated in FIGS. 8A and 8B.

When the operation to select the icon representing the type of a specific defect on the third display or the position of a specific defect in the preview image on the fourth display is received, the display unit. (e.g., the web browser) of the client 201 displays the setting screen D6 for specifying the setting corresponding to the selected specific defect so as to suppress the defect. The display unit (e.g., the web browser) of the client 201 requests the printer 101, or the like, which has formed the image (the image including the selected specific defect) on a sheet (recording medium), to execute the setting based on the setting operation on the setting screen D6.

The control or the change to the set value in the printer 101 (image forming apparatus) eliminate or suppress various image defects (abnormalities). FIG. 15 is a table in which each type of defect (abnormality) is associated with the control or the setting to be executed so as to eliminate the defect. On the display unit (e.g., the web browser) of the client 201, the setting screen D6 after the type of specific defect is selected is the screen that makes it possible to request the control or the setting corresponding to the selected type of defect based on the table illustrated in FIG. 15.

The setting screen D6 is configured by using HTML and JavaScript that are the screen information acquired by the display unit (e.g., the web browser) of the client 201 from the server 202 and is displayed. The screen information on the setting screen D6 includes buttons N for invoking the corresponding APIs of the printer 101 to perform a specific control on the printer 101 and request a change in the set value. In this case, the client 201 directly requests the printer 101 to execute the setting.

For example, when the icon representing a dot blur on the third display or the position (a specific defect) in the preview image on the fourth display is selected as illustrated in FIG. 14, the setting screen (setting selection screen) D6 for selecting the control or the setting required to eliminate the specific defect is displayed. The setting screen D6 selectively displays, as selection items, the buttons N for executing the refresh of a developing material, changing the set value of the temperature of a heating roller, changing the set value of the temperature of a pressure roller, and changing the set value for the frequency of fixing cleaning.

When a specific setting (e.g., executing the refresh of a developing material) is selected, the display unit (e.g., the web browser) of the client 201 displays a setting execution screen D7 so as to cause the printer 101 to execute the setting or the control (the control on the refresh of the developing material).

The setting execution screen D7 includes execution buttons O and P for invoking the corresponding predetermined API of the printer 101 as described above. Pressing the execution buttons O and P causes the display unit (e.g., the web browser) of the client 201 to transmit the request to the specific printer 101 (the printer that has executed the job including the defective page displayed on the third display and the fourth display) so as to execute the selected control or change in the setting.

The display unit (e.g., the web browser) of the client 201 may transmit the execution request or the setting target to the server 202, and the server 202 may identify the target printer based on the job information and transmit the request to the identified printer 101. When cancel buttons Q and R are pressed on the setting execution screen D7, the display unit (e.g., the web browser) of the client 201 returns to the previous screen (e.g., the setting selection screen).

FIG. 16 displays a selection screen D8 for selecting the item executable by the user with regard to a specific defect (abnormality) when the type of defect is selected. The selection screen D8 includes buttons S with which multiple items are selectable. For example, the button S for checking the job having the identical type of abnormality or defect is the button for displaying the search dialogue D5 that is the search screen on which the specific defect has been selected as is the case with FIG. 13. The button S for eliminating the selected abnormality or defect is the button for displaying the setting screen D6 to eliminate the specific defect as is the case with FIG. 14. The button S for changing the determination criterion for the selected defect causes the screen to be displayed so as to change the setting to increase (tighten) or decrease (loose) the threshold or coefficient that is the determination criterion corresponding to the selected defect. The button S for executing reprinting of a page causes the screen to be displayed to cause the printer 101 to execute reprinting of the page. With regard to the type of selected specific defect (abnormality), the display unit (e.g., the web browser) of the client 201 may display a list of items that may be operated by the user.

The functions of devices in the image forming system 100, the printer 101, the checking device 102, the DFE 104, the server 202, and the client 201 may be installed in a different device in an integrated or separated manner. For example, the functions of the checking device 102 and the DFE 104 may be installed in the printer 101. The function of the server 202 may be installed in the checking device 102, the DFE 104, or the printer 101.

The screen displayed by the display unit (e.g., the web browser) of the client 201 may be modified as appropriate, various displays may be combined, or a required screen transition may be added as appropriate. For example, a confirmation screen, or the like, may be inserted to confirm that the operator is to execute or display the function when each button is pressed. The screens D1 to D4, or the like, may be independently displayed as a single window. The screen displayed due to the switch between the tabs for the first display and the second display or a window screen such as the search dialogue D5 may be displayed within the same single screen as the screens D1 to D3.

As described above, according to the present embodiment, the presence or absence of a state abnormality of a printed material is determined, grouping is executed on a print-job basis, the detailed checking result information that is uniformly managed in a database is associated, and then search is conducted. Thus, the list of checking results is displayed so that the printed material having a state abnormality (defect) may be determined among different printed materials at one view, search is conducted based on the detailed checking result information, and the highlighting or the narrowing-down display is performed for the print jobs having a state abnormality (defect), whereby it is possible to efficiently present the checking result desired by the user.

As the user of the image forming apparatus easily understands an image defect and a state abnormality in each job of a printed material and in each page and determines whether the reprinting needs to be performed, the user may easily correct the printed material (e.g., the reprinting or replacing work). For example, it is possible to entirely determine which job includes a page having an abnormality (defect) in a job, and the type of abnormality (the type of defect) of the page. Although the necessity of reprinting is different depending on each user or each job or page, it is easy to make a determination and minimize the pages to be reprinted. It is possible to know an abnormality (defect) by using both the display of an individual abnormality (defect) using the display function and the cross-sectional search result across jobs or pages using the search function.

A user or an administrator who maintains the apparatus may, for example, easily change the set value regarding the image processing of the image forming apparatus or repair the apparatus so as to eliminate an image abnormality (defect). For example, the user, or the like, determines the type of image abnormality (defect) across jobs or pages in addition to an individual abnormality (defect) using the display function so as to understand the setting to be changed, the thing to be repaired, and the tendency of abnormality (defect), properly repair a failure, and change the set value for specific image processing in an easy manner.

An embodiment provides an advantageous effect that it is possible to efficiently present a desired checking result to a user.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
    circuitry configured to display a display screen, the display screen including,
        a first display or a second display, the first display displaying, in units of a print job, checking result information obtained by comparing a read result with reference data on an image to be formed on a recording medium, the read result being obtained by reading the recording medium having the image formed thereon,
        the second display displaying only a number of print jobs, each of the number of print jobs associated with at least one of a number of abnormalities, the number of print jobs including a displayed print job including a page having the at least one abnormality in the image formed on the recording medium based on the checking result information, and
        a third display displaying information about the page in the displayed print job and abnormality type information, the information about the page in the displayed print job including the page having the at least one abnormality and the abnormality type information indicating a type of the at least one abnormality present in the page,
    wherein the first display and the second display are displayable in a switchable manner on a first section of the display screen in accordance with a selection by a user, and the displaying the display screen includes displaying the first display or the second display simultaneously with the third display, the third display displayed on a second section of the display screen, and simultaneously displaying a fourth display, the fourth display indicating a position of the at least one abnormality present in the page displayed in the third display.

2. The information processing apparatus according to claim 1, wherein the circuitry is further configured to execute a narrowing-down setting display to permit setting a condition for narrowing down the checking result information displayed in the first display or the second display in units of a print job.

3. The information processing apparatus according to claim 1, wherein the circuitry is further configured to highlight a row of the displayed print job including the page having the at least one abnormality in the first display or the second display.

4. The information processing apparatus according to claim 3, wherein the circuitry is configured to change a color density for highlighting in accordance with a level of the at least one abnormality in the first display or the second display.

5. The information processing apparatus according to claim 1, wherein
the information related to the page in the displayed print job and displayed by the third display includes page identification information and job identification information, the page identification information identifying the page including the type of the at least one abnormality indicated by the abnormality type information, the job identification information identifying the job including the page,
the abnormality type information indicating the type of the at least one abnormality comprises at least one icon corresponding to the type of the at least one abnormality, and
the third display displays the job identification information, the page identification information, and the at least one icon in association with each other.

6. The information processing apparatus according to claim 2, wherein
the third display displays information about a page included in a print job selected in accordance with another selection by the user with respect to a list of the number of print jobs, the selected print job being displayed in the second display switched from the first display, and
the fourth display displays a preview image of the page of the selected print job, the preview image including a position of the at least one abnormality present in the page of the selected print job.

7. The information processing apparatus according to claim 6, wherein the circuitry is configured to
display an icon representing a type of the at least one abnormality in the third display or a position of the at least one abnormality in the preview image in the fourth display, to allow a selection of the icon or the position, and
when an operation for the selection is received, display the narrowing-down setting display in a state where the a type of abnormality corresponding to the icon or the position selected in the selection has been selected so as to cause the first display or the second display to display only print jobs including a page having the type of abnormality, and a narrowing-down condition in the narrowing-down setting display is changeable.

8. The information processing apparatus according to claim 6, wherein the circuitry is configured to
display an icon representing a type of the at least one abnormality in the third display or a position of the at least one abnormality in the preview image in the fourth display, to allow a selection of the icon or the position,
when an operation for the selection is input, display a setting screen for executing a setting corresponding to the at least one abnormality so as to suppress the at least one abnormality, and
request an image forming apparatus that has formed the image on the recording medium to execute the setting based on a setting operation on the setting screen displayed.

9. The information processing apparatus according to claim 1, wherein the position of the at least one abnormality displayed in the fourth display is surrounded by a color frame in a color identical to a color of a color frame for the abnormality type information displayed in the third display.

10. An information processing system comprising:
a checking device configured to output checking result information; and
the information processing apparatus according to claim 1.

11. A non-transitory computer-readable medium having computer readable program codes, the program codes when executed causing a computer to function as a display unit configured to display a display screen including:
a first display or a second display, the first display displaying, in units of a print job, checking result information obtained by comparing a read result with reference data on an image to be formed on a recording medium, the read result being obtained by reading the recording medium having an image formed with a reading unit,
the second display displaying only a number of print jobs, each of the number of print jobs associated at least one of a number of abnormalities, the number of print jobs including a displayed print job including a page having the at least one abnormality in the image formed on the recording medium based on the checking result information, and
a third display displaying information about the page in the displayed print job and abnormality type information, the information about the page in the displayed print job including the page having the at least one abnormality and the abnormality type information indicating a type of the at least one abnormality present in the page,
wherein the first display and the second display are displayable in a switchable manner on a first section of the display screen in accordance with a selection by a user, and the displaying the display screen includes displaying the first display or the second display simultaneously with the third display, the third display displayed on a second section of the display screen, and
the displaying the display screen further includes simultaneously displaying a fourth display, the fourth display indicating a position of the at least one abnormality present in the page displayed in the third display.

12. The non-transitory computer-readable medium according to claim 11, wherein the read result is an image without the at least one abnormality.

13. The non-transitory computer-readable medium according to claim 11, wherein the read result corresponds to the page in the displayed print job.

14. The information processing apparatus according to claim 1, wherein the first display and the second display each further include a thumbnail image corresponding to each print job included in the first display or the second display, respectively.

15. The information processing apparatus according to claim 1, wherein the circuitry is further configured to:
   receive a search query from a user, the search query including an input regarding a specific abnormality to search for among all of the print jobs.

16. The information processing apparatus according to claim 15, wherein the circuitry is further configured to:
   search the abnormality type information corresponding to each of the print jobs for the specific abnormality included in the search query; and
   display a search results screen based on the results of the searching.

17. The non-transitory computer-readable medium according to claim 11, wherein the first display and the second display each further include a thumbnail image corresponding to each print job included in the first display or the second display, respectively.

18. The non-transitory computer-readable medium according to claim 11, wherein the computer is further configured to:
   receive a search query from a user, the search query including an input regarding a specific abnormality to search for among all of the print jobs;
   search the abnormality type information corresponding to each of the print jobs for the specific abnormality included in the search query; and
   display a search results screen based on the results of the searching.

* * * * *